Oct. 14, 1969 R. A. HOLZL ET AL 3,472,443
WELD TIP GUIDE AND APPARATUS
Filed April 12, 1966 2 Sheets-Sheet 1
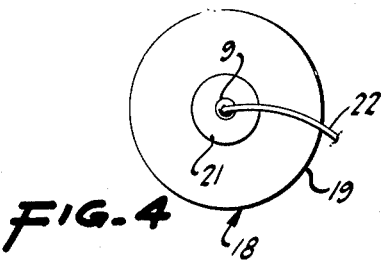
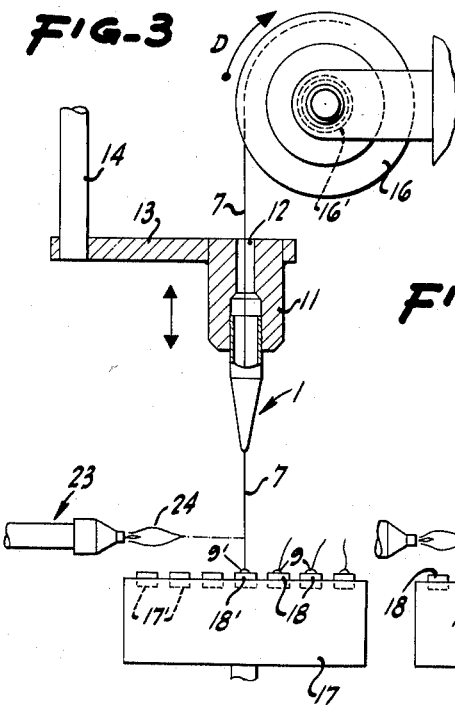
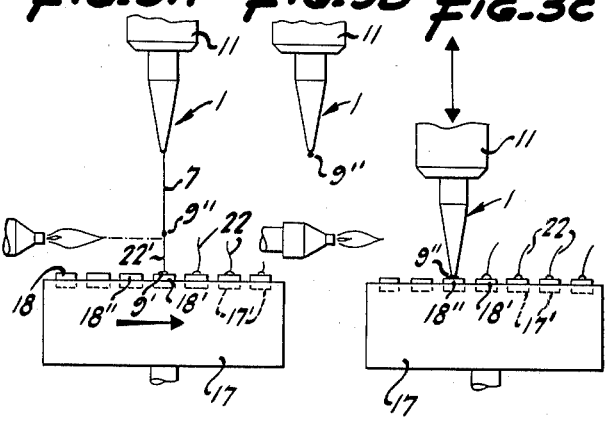
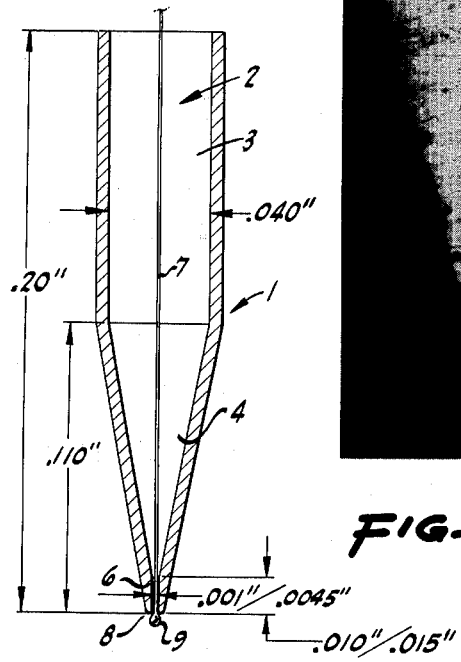
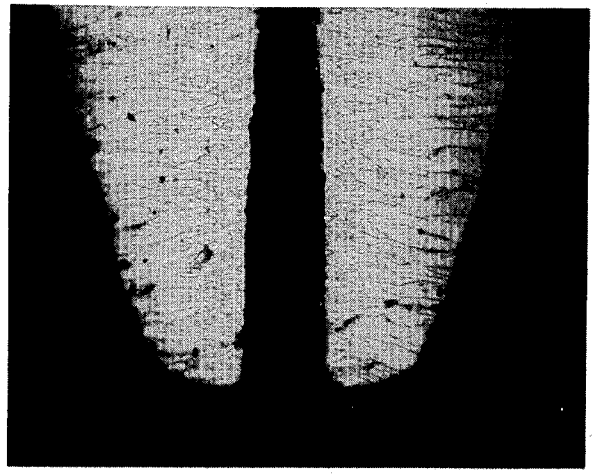
INVENTORS
ROBERT A. HOLZL
WILLIAM D. KOENIG
BY
Stanley Bialor
ATTORNEY United States Patent Office 3,472,443
Patented Oct. 14, 1969

3,472,443
WELD TIP GUIDE AND APPARATUS
Robert A. Holzl, La Canada, and William D. Koenig, Sylmar, Calif., assignors, by mesne assignments, to Fansteel Inc., a corporation of New York
Filed Apr. 12, 1966, Ser. No. 542,070
Int. Cl. B23k 1/00, 3/00
U.S. Cl. 228—3     11 Claims

ABSTRACT OF THE DISCLOSURE

A weld tip for bonding fine electrical conductor wire to electrical components is formed of chemically vapor deposited high melting point refractory material, such as tungsten, free of lower melting point cementitious bonding material, by chemical vapor deposit of said material about a mold which provides a mold smooth guide passage for the wire.

---

This invention relates to weld tip guides, and more particularly, to a weld tip of a particular physical construction, method of making same and apparatus incorporating such tip.

Weld tips are widely used in the manufacture of miniature electrical components, such as transistors, tunnel diodes and diodes, to guide, and bond a fine electrical conductor wire or filament, such as silver, gold, aluminum, copper, or other relatively low melting point materials, to the component so as to provide junction connecting means for attachment to a main conductor employed in such miniature circuitry. The fine wire which is to provide the junction connection is usually about 0.7 to 4 mils in thickness (0.0007" to 0.004"), and connection of the wire to the component is effected by forming a molten or semi-molten hot glob at the end of the wire, and bonding the glob while it is still molten or soft to the component under a relatively high pressure which may be in the order, for example, of about 21,000 pounds per square inch.

In such operation, the fine wire is guided through a passageway in the weld tip, and after the glob is formed, the weld tip presses the same to the electric component to effect the bonding. To provide proper guiding of the fine wire, it is critical that the weld tips have accurate dimensions; particularly at the end thereof which presses against the glob. Moreover, the weld tip must be of hard material which does not react with the fine wire or alloy therewith. Otherwise, the weld tip will deteriorate due to reaction with the wire, and precise bonding of the fine wire will be impeded. Therefore, it is usual to make the weld tip of hard refractory material which is non-reactable with the hot glob and the fine wire.

Highly refractory metals having a Vickers microhardness in excess of about 400 kg./mm.$^2$ and which are of a relatively high melting point compared to that of the wire, are suitable for this purpose, such as tungsten, rhenium, and molybdenum, and alloys thereof, such as tungsten carbide, tungsten-molybdenum and tungsten-rhenium. Tantalum carbide and columbium carbide alloys are also suitable. It is commercially unfeasible to machine the wire guide passageway in the weld tip from such refractory materials because of the extremely small dimensions of such passageway, particularly at the bonding end of the weld tip.

Hence, weld tips heretofore used are made generally of cermets, namely, highly refractory metal particles bonded together with relatively low melting point cementitious metals, such as cobalt, titanium and nickel, and sintered, but there strength is not all to be desired. Moreover, in cermets, the low melting point cementitious bonding material reacts with the fine wire, and also leaches out in use causing loss in strength and forming voids in the guide surface for the fine wire. Electrical chemical deposition forming methods may be employed for making the weld tips but materials that can be readily formed electrochemically, such as nickel, copper, iron or the like, react with the fine wire and, hence, are objectionable.

This invention overcomes the foregoing problems. Summarizing the same, it embodies a weld tip formed of molecularly bonded vapor deposited refractory material desirably of a Vickers microhardness above about 400 kg./mm.$^2$ which is non-reactable with the fine wire and hot glob formed thereon, and which by virtue of the vapor deposition, has the grain of the material extending substantially perpendicular to the axis of the tip to withstand compressive forces. The weld tip is made by providing a male mold for effecting vapor deposition of the refractory material over the mold. After the refractory material has been vapor deposited as a solid coating about the mold, separation of the coating from the mold is effected, and an end of the tip is trimmed off. This results in a guide opening for the fine wire in the weld tip which is substantially mold smooth thus presenting minimum frictional resistance to the wire passing through the tip.

The apparatus embodying the tip comprises a support sleeve upon which the weld tip is rigidly supported, and which is mounted for reciprocating back and forth movement; and heating means for repeatedly severing the fine wire and forming hot globs on the wire, so that when the tip is brought in contact with a glob and moved under pressure against an electrical component, it will bond a severed wire section to the electrical component.

From the preceding, it is seen that the invention has as its objects, among others, the provision of a weld tip which can be accurately made by simple vapor deposition methods, which has a relatively long life by virtue of the physical grain structure of the weld tip material resulting from vapor deposition of the material, and which will guide a fine electrical conductor wire smoothly and precisely without breaking the same. Other objects of the invention will become apparent from the following more detailed description, and accompanying drawings in which:

FIG. 1 is an enlarged vertical cross-sectional view of the weld tip hereof;

FIG. 2 is a vertical cross-sectional photo-micrograph of the bonding end portion of the weld tip of FIG. 1 magnified 400 times (400 power);

FIG. 3 is a schematic elevational view, partly in section, of a form of weld tip apparatus;

FIG. 3A is a similar view of a portion of the apparatus shown in FIG. 3, illustrating a step of the operation wherein the fine wire is being severed;

FIG. 3B is a schematic view illustrating the step in the operation wherein a glob formed on the fine wire becomes engaged with the weld tip after severing of a section of the wire;

FIG. 3C is a schematic view illustrating the apparatus in a succeeding position, with the fine wire glob being bonded to a miniature electrical component, by pressure applied by the weld tip;

FIG. 4 is an enlarged plan view, of a conventional form of a transistor, having a fine wire section bonded thereto;

Figure 5:
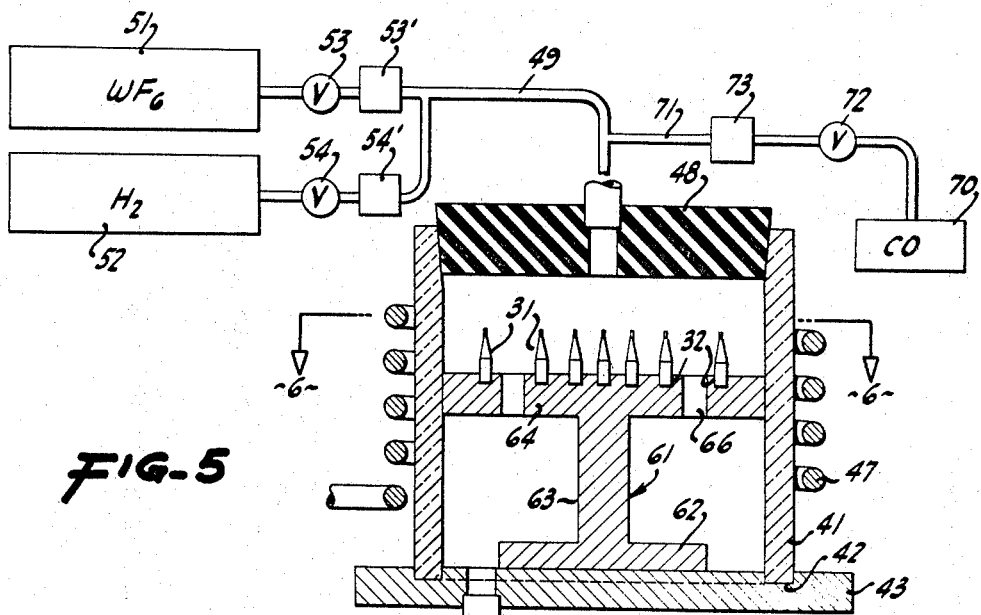
FIG. 5 is a schematic elevational view, partly in section, of a more or less conventional vapor deposition apparatus, containing a support for a plurality of male molds upon which vapor deposited refractory coatings are formed.

The shape of a conventional form of weld tip 1 is illustrated in FIG. 1 with typical dimensions thereon to reveal the preciseness and smallness of the tip. Such tip comprises an axially extending passage 2 including an upper cylindrical portion 3 communicating with an inwardly tapered conical portion 4, in turn, communicating with a terminal cylindrical guide opening 6 which is very short in length and even narrower in diameter in order to guide a fine wire or filament therethrough with preciseness, and without breaking the wire. As indicated on the drawing, guide opening 6 is of practically capillary diameter varying from about 0.001 inch to 0.0045 inch for the fine wire 7 which, as previously related, usually varies in diameter from about 0.7 to 4 mils. These are typical dimensions; and, for example, if the wire is 0.7 mil in diameter, guide opening 6 is of smaller diameter in the order of 0.001 inch, but if a greater diameter wire is employed, say, 4 mils, the diameter of opening 6 is about 4.5 mils.

Guide opening 6 may vary in length, a typical variation being as shown on the drawing of about 0.010 to 0.015 inch. In this connection, although the dimensions are not especially critical at the end of the tip, they are merely given to indicate the minuteness of such dimensions. Guide opening 6 must be sufficiently long, however, to guide the wire 7 accurately without kinking; and at the same time, it must be sufficiently narrow so that the end 8 of the tip adjacent the guide opening can engage a soft or molten glob 9 formed on the wire in a manner to be explained.

As shown in FIGS. 3, 3A, 3B, and 3C, a more or less conventional form of mechanism for holding the weld tip 1 comprises a support sleeve or collar 11 of metal such as steel, having an axially extending enlarged passage 12 through which wire 7 extends. Sleeve 11 is fixedly mounted on an arm 13 fixedly connected to a rod 14 mounted for up and down reciprocating movement by conventional mechanism (not shown).

Fine wire 7 is coiled about a frictionally mounted spool 16 which is urged by a conventional coil spring 16′ continuously in a direction opposite to the direction in which wire 7 is pulled off the spool, as indicated by direction arrow D in FIG. 3. The top end of weld tip 1 is removably press-fitted or otherwise suitably removably fixed in passage 12 of sleeve 11 so that when the sleeve is reciprocated back and forth the weld tip will move in the same direction as the sleeve is moved.

A work support 17 desirably of steel or aluminum, is mounted for step by step rotational movement below the reciprocatably mounted weld tip 1, and has a plurality of positioning recesses 17′ equally spaced about its circumference for supporting a plurality of miniature electrical components 18. A typical electrical component is shown in FIG. 4 in the form of a small transistor comprising a base in the form of a brass wafer 19 of an average diameter of about 0.25 inch and having a central transistor element 21, usually of silicon or germanium, and generally of about 0.010 inch in diameter. In the finished component, a section 22 of the fine wire filament 7 is bonded to transistor element 21 by a glob 9 after the glob has hardened.

Heating means 23, desirably a hydrogen torch capable of producing a high temperature flame 24 of about 3500° F., is mounted for back and forth reciprocating movement transversely across wire 7, which with reference to FIG. 3 is in a plane perpendicular to the plane of the sheet of the drawing, so that when flame 24 is in line with wire 7, it will sever the wire and form glob 9″, as shown in FIG. 3A. In the method of operation, a plurality of electrical components 18 is mounted about the periphery of work support 17; and sections 22 of the fine wire are successively bonded to successive components 18 in the following manner with reference to FIGS. 3, 3A and 3B and 3C.

FIG. 3 illustrates at the right-hand side three components 18 to which wire sections have been bonded, and to the left thereof a component 18′ to which the entire length of wire 7 has been bonded by glob 9′ before severing thereof by the flame, with the weld tip 1 having been moved to its uppermost position just after such glob 9′ has been bonded to the component 18′. Torch 23 is then moved across the line or wire 7 thus severing the same to form a severed section 22′ bonded to component 18′ by glob 9′ and forming a new glob 9″ on the bottom end of main wire 7, as shown in FIG. 3A.

Still referring to FIG. 3A, since the coil of wire on spool 16 is always resiliently urged in a direction away from work support 17, after severing of wire section 22′, the wire 7 will be retracted through sleeve 11 until glob 9″ engages against the guide end of weld tip 1, as shown in FIG. 3B, whereupon when the weld tip 1 is again moved downwardly, it will move the new glob 9″ and wire downwardly because of engagement of glob 9″ with the guide end of the weld tip, to bond the glob to the next adjacent electrical component 18″ which has been moved under the weld tip by rotation of work support 17 one step to the position shown in FIG. 3C. Immediately after glob 9″ in FIG. 3C has been bonded to the component 18″, the weld tip and support sleeve 11 therefor are moved upwardly to the position shown in FIG. 3, the wire is severed as shown in FIG. 3A, and then the work support is simultaneously moved one more step for the next cycle of operation.

The reciprocating movement of the weld tip, the reciprocating movement of the torch 23 across the path of wire 7, and the step by step movement of the work support 17 are all correlated by conventional mechanism, not shown, so that successive wire sections 22 are bonded to successive electrical components 18 while at the same time the wire is repeatedly severed to form the short connecting wire sections 22 with the wire and glob always under control of the weld tip movements, resulting from the continual urging of wire 7 in a direction away from work support 17 by coil spring 16′.

As a typical example, an advantageous wire filament is gold of about 1 mil diameter; and with such metal the temperature of the hydrogen flame of approximately 3500° F. will result in repeatedly severing wire 7. To insure that each glob remains at least soft until it is bonded to a component, metallic work support 17 is preferably heated and so is sleeve 11; a suitable temperature for the work support being about 350° F. and for the sleeve about 250° F., but these temperatures are not critical. Electrical resistance elements (not shown) are generally employed as the heating means for these parts.

When all the components on rotatable work support 17 have been bonded to sections of the wire, the work support can be stopped and completely reloaded. However, it is preferable to remove a plurality of the wire bonded components as they are bonded, and replace them with unbonded components which are to have wire sections bonded thereto, so that operation is substantially continuous.

As far as the material of the weld tip is concerned, any suitable highly refractory hard material desirably of a Vickers microhardness in excess of about 400 kg./mm.$^2$, and which can be formed as a coating about a male mold by conventional vapor deposition methods can be employed as long as such weld tip material is non-reactable with the hot glob and the wire. As previously mentioned, suitable materials for this purpose are tungsten, rhenium, molybdenum, and tantalum or the aforementioned alloys of these materials.

Figure 7:
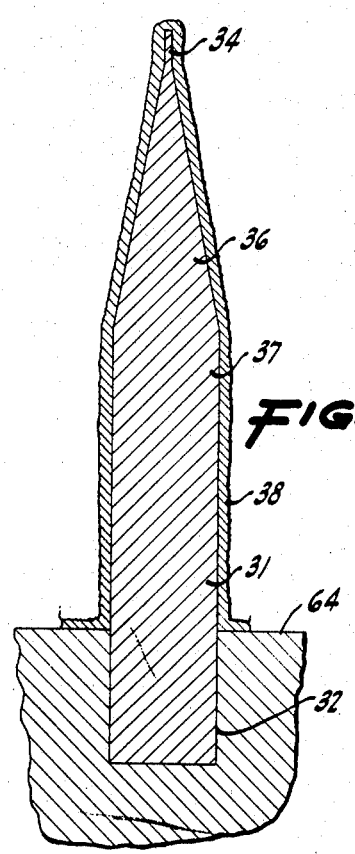
FIG. 7 is an enlarged vertical cross-sectional view illustrating a male mold after the refractory material has been vapor deposited as a solid coating thereon.

FIG. 7 illustrates a male mold 31 upon which the highly refractory material is deposited by vapor deposition, removably mounted in a recess 32 in a support table 64. The mold has a terminal end thereof as a very fine projection 34 which forms the aforementioned cylindrical guide opening 6 of the weld tip; a tapered portion 36 which forms inwardly-tapered conical weld tip portion 4; and a cylindrical portion 37 which forms cylindrical portion 3 of the weld tip. By the vapor deposition hereof, a continuous solid integral coating 38 of the refractory material in which all the material becomes molecularly bonded upon cooling as a result of the vapor deposition, is formed about the male mold 31 to a desired thickness which is not critical but sufficient to allow subsequent exterior machining operations, a suitable thickness being about 0.015 to 0.030 inch, and preferably about 0.020 inch.

When the coating 38 is deposited, it will be noted that it also deposits over the end of fine projection 34, but after the desired thickness of coating has been formed, separation is effected between the mold and the solid coating in a manner to be explained, and the portion of the coating over the end of projection 34 is trimmed off by cutting or grinding to leave an open end at the terminus of weld tip guide opening 6. After such separation, the interior surface of the weld tip will be substantially mold smooth resulting from the smooth surface of the mold.

After separation of the weld tip from the mold, it is desirable to machine the exterior surface by grinding or otherwise, to provide a relatively smooth surface. The exterior surface offers no commerical problem in so finishing or machining the same because it is readily accessible. In such machining of the exterior surface, the weld tip end portion is formed with a taper to the configuration shown under 400 power magnification in FIG. 2, so as to conform substantially to the taper of the outer surface of tapered portion 4 of the weld tip, with the open end 8 of the tip extending transversely to the tip to provide sufficient surface contact against the globs 9. Such end 8 may be beveled as shown in FIG. 2 or may be cut off substantially flat.

In this connection, it will be noted with reference to FIG. 2 that the vapor deposited material provides an important functional and structural property to the weld tip because the vapor deposition method causes the grain of the material to extend substantially perpendicular to the axis of the weld tip, thereby materially increasing the compressive strength of the tip. This is important in making for long life of the tip, thus obviating necessity of repeatedly having to replace tips, and also making for great economy because weld tips are costly.

As the material for the male mold 31, any suitable material of relatively high thermal conductivity can be employed, which has a greater coefficient of expansion than the vapor deposited material of the coating, and is non-adherent to the vapor deposited material, so that after the elements have cooled, the mold may be readily extracted merely by manually pulling it out of the weld tip formed thereover. A desirable material for such purpose is stainless steel, preferably No. 302 American Iron and Steel Institute (AISI). Other suitable materials are steel No. 1095 (AISI), or titanium. If the vapor deposited material is not molybdenum, then such metal is suitable for mold 31. In case it is difficult to remove the mold, since most of the highly refractory desirable materials for the weld tip, such as tungsten and molybdenum are acid-resistant, the mold can be etched out of the tip by acids, such as hydrochloric or nitric, leaving the weld tip intact for exterior machining purposes.

The following is a typical operating example for making a weld tip of the dimensions indicated, by vapor deposition, wherein the metal being deposited to form the weld tip wall is tungsten and the male molds are of the aforementioned stainless steel. Conventional vapor deposition apparatus and methods of applying the tungsten coating are employed. As shown in FIG. 5, the apparatus comprises glass tubing 41 removably mounted and sealed in a cylindrical recess 42 formed in base 43 which may also be of glass or any other suitable material such as brass or steel. Base 43 is connected by suitable piping 44 to vacuum pump 46; a conventional vacuum gauge 46' being connected in piping 44. Induction heating coil 47 is positioned about tubing 41 to provide the necessary heat for effecting the vapor deposition.

A conventional rubber stopper 48 is removably secured in the end of tubing 41 opposite base 43, and is connected to tubing 49 connected, in turn, respectively, to a source 51 of tungsten hexafluoride ($WF_6$) and to a source 52 of hydrogen ($H_2$) which provides a reducing gas. A manually operable valve 53 is provided to control the flow of tungsten hexafluoride; a conventional flowmeter 53' being associated with valve 53 to indicate the flow rate. Another valve 54 in association with a conventional flowmeter 54' controls the flow of hydrogen, so that the flow rates of the tungsten fluoride and hydrogen as induced by the vacuum can be properly correlated to provide the desired proportion of these gases in the vapor deposition chamber provided by glass tube 41.

Figure 6:
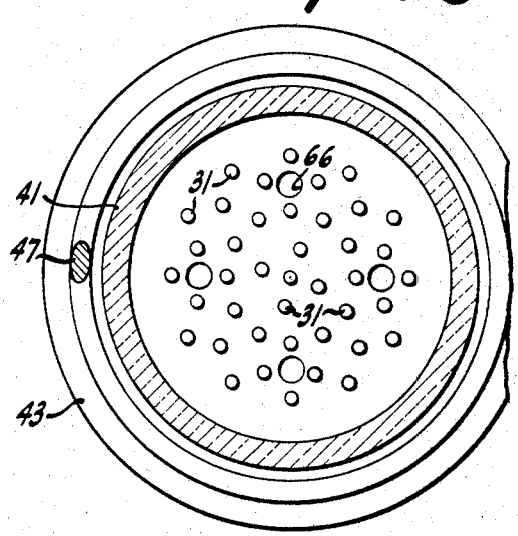
FIG. 6 is a transverse horizontal section, taken in a plane indicated by line 6—6 in FIG. 5.

With reference to FIGS. 5 and 6, a work holder 61 is provided for removably supporting a plurality of male molds 31 in vapor deposition chamber 41 to enable coating of such plurality of molds at one time. The holder comprises a support base 62 removably positioned on vapor deposition base 43, and having upright post 63 to which circular work support table 64 is attached. The support table has a plurality of holes 66 extending therethrough to permit flow of the depository vapor and gases therethrough, and to exhaust piping 44. Also, a plurality of the aforementioned small recesses 32 is provided in the top of the work support table 64 to removably hold a like number of molds 31 as shown in the enlarged view of FIG. 7.

Mold holder 61 may be of any suitable material non-adherent to the vapor deposited material and of relatively low thermal conductivity, so as to minimize coating thereof by the vapor deposited material. Suitable materials are boron nitride, aluminum oxide or glass, preferably boron nitride. In the example hereof, thirty-eight molds 31 are coated at one time. Hence, work table 64 is provided with thirty-eight recesses 32 to support the male molds.

For providing a coating of about 20 mil in thickness, about all the molds 31, the molds are heated to about 550° C. by induction coil 47. In starting, one liter of hydrogen is allowed to flow into the vapor deposition chamber 41 before the tungsten hexafluoride is introduced into the chamber, to insure that the molds are at the desired temperature of 550° C. before the vapor deposition is effected by introduction of the tungsten hexafluoride into the chamber. It takes about 2 to 3 minutes for the molds to be heated to the desired temperature, after heat is first applied to the molds.

When the temperature is stabilized, tungsten hexafluoride is allowed to flow into the chamber at the rate of about 4.5 grams per minute, and a hydrogen gas flow of about one liter per minute is maintained under a vacuum equivalent to 15 inches of mercury. After about 45 minutes, the flow of gas is terminated and the heating discontinued.

After cooling, the glass tubing 41 is removed from base 43 to expose the coated molds; and the solid resultant molecularly bonded tungsten coating, having the aforementioned grain structure illustrated in FIG. 2, is removed from the molds and machined and finished in the manner already described.

The above times and temperatures and other conditions are merely by way of example because other temperatures and times can be employed. For example, if the vapor deposition temperature is less than 550° C., the running time will be longer. Also, if other highly refractory metals are to be deposited on the molds, conditions can be varied in accordance with well-known vapor deposition methods.

In the above example the hardness of the deposited tungsten will be about 400 to 550 on the aforementioned Vickers scale. Increased hardness can be obtained by carbonizing the tungsten while it is being deposited on the molds, with a carbonizing agent, such as methane but desirably, carbon monoxide (CO). For such purpose, chamber 41 is connected to a source 70 of carbon monoxide by piping 71 in which are connected a control valve 72 and a flowmeter 73.

A flow rate of 2 parts by volume of carbon monoxide to 1,000 parts of combined volume of the tungsten hexafluoride and the hydrogen, under the temperature and time conditions and flow rate described in the above example, produces a Vickers hardness of about 2,150 but such hardness can be increased or decreased by increasing or decreasing, respectively, the carbon monoxide flow rate.

What is claimed is:

1. A weld tip having an axially extending passage terminating in a relatively small diameter guide opening at an end thereof through which a fine electrical conductor wire is adapted to pass and which is for engaging a hot glob on said wire formed by application of heat thereto to bond the wire to an electrical component by application of pressure to said glob by said weld tip end, said weld tip consisting essentially of a solid continuous integral mass of high melting point refractroy material free of lower melting point cementitious bonding material whereby said tip is non-reactable with said hot glob and wire, the surface of both said axially extending passage and said guide opening having a mold smooth configuration.

2. The weld tip of claim 1 wherein said material is an elemental metal or alloy thereof having a grain extending substantially perpendicular to the axis of said tip.

3. The weld tip of claim 1 having a Vickers microhardness in excess of about 400 kg./mm.$^2$.

4. The weld tip of claim 2 having a Vickers microhardness in excess of about 400 kg./mm.$^2$.

5. The weld tip of claim 1 wherein said material is a molecularly bonded chemical vapor deposit.

6. The weld tip of claim 2 wherein said material is a molecularly bonded chemical vapor deposit.

7. The weld tip of claim 2 wherein said material is tungsten.

8. The weld tip of claim 7 wherein the tungsten is a chemical vapor deposit.

9. Apparatus for bonding a fine electrical conductor wire to an electrical component, comprising a support for said component, means spaced from said support for holding a coil of said wire, heat applying means between said coil holding means and said support for repeatedly severing said wire and forming a hot glob on successive severed portions thereof, a support sleeve between said heating means and said coil holding means through which the wire passes and which is mounted for reciprocating movement, and a weld tip mounted in said support sleeve having an axially extending passage terminating in a small guide opening through which the wire passes, the end of said tip at said guide opening being engageable with each successive glob when the support sleeve is moved toward the work support to move such hot glob in contact with the component to thus bond the same to the component; said weld tip consisting essentially of a solid continuous integral mass of high melting point refractory material free of lower melting point cementitious bonding material whereby said tip is non-reactable with said hot glob and wire, the surface of both said axially extending passage and said guide opening having a mold smooth configuration.

10. The apparatus of claim 9 in which the surface of the axially extending passage and guide opening of the weld tip is mold smooth, and the grain of the refractory material is substantially perpendicular to the axis of said tip.

11. The apparatus of claim 9 in which the weld tip refractory material is a high melting point metal or metal alloy having a Vickers microhardness in excess of about 400 kg./mm.$^2$, and the weld tip end surface adjacent said guide opening is transverse to said axis.

References Cited

UNITED STATES PATENTS

| | | | |
|---|---|---|---|
| 3,116,655 | 1/1964 | Esopl | 228—3.5 |
| 3,314,582 | 4/1967 | Haigler | 228—3.5 X |
| 3,134,559 | 5/1964 | Lasch | 228—3.5 X |

RICHARD H. EANES, JR., Primary Examiner